Oct. 30, 1962    E. B. CLARK    3,061,338
FASTENING OF INSERT IN UNDERFLOOR DUCT
Filed Dec. 1, 1958

Inventor:
Edward B. Clark
by Richard L Caslin
His Attorney 3,061,338
FASTENING OF INSERT IN UNDERFLOOR DUCT
Edward B. Clark, Milford, Conn., assignor to General
Electric Company, a corporation of New York
Filed Dec. 1, 1958, Ser. No. 777,281
1 Claim. (Cl. 285—202)

The present invention relates to a manner of fastening an insert in an opening in a wall of an electrical raceway or duct. Underfloor raceways are used in commercial, industrial and institutional buildings for feeding and distributing power, telephone and signal systems through the floors. Rectangular duct of steel is the most popular construction, although fiber duct has also gained wide acceptance. Almost all underfloor distribution systems will include junction boxes for joining two or more intersecting runs of duct. Junction boxes have a removable top cover that is mounted flush with the top surface of the floor. The covers would be removed when the electricians are pulling the various wires into the system. Also, there are couplers for joining tandem lengths of duct.

Connections are made to the electrical circuits by feeding the wires out of the ducts through annular inserts that are fastened to the top wall of the duct. Floor outlet boxes are mounted on the top of the inserts. These outlet boxes contain convenience outlets, telephone bushings or similar types of wiring devices. There are in us two general classes of inserts. One is a factory-set insert and the other what is known as an after-set insert that is usually installed at the building site by the electrician when a special position of the insert is desired. The present invention relates to the first class of factory-set inserts.

The principal object of this invention is to provide a novel manner of fastening an annular insert of intricate shape in an opening in a wall of an electrical duct.

A further object of this invention is to incorporate a novel fastening means for holding an insert to a metal wall where the insert is a die-casting with an intricate configuration.

A still further object of this invention is to provide a novel fastening means for a die-cast insert that is adapted to be used with an electrical duct and incorporating bendable table that permanently fasten the insert to the duct to prevent the entrance of moisture.

The present invention is being used with a die-cast insert that is to be fastened in an opening in the top wall of an electrical duct. The insert has the general form of an annular member and it is supported on the edge of an opening in a wall of the duct. The insert also has a skirt extending down into the opening to line the interior edges thereof and protect the insulation of the wires from injury while the wires are being pulled through the ducts. A group of bendable tabs extend upwardly from the top surface of the wall of the duct and are disposed on opposite sides of the opening. The tabs are joined to the wall of the duct adjacent the edge of the opening. The supporting portion of the insert has a plurality of mating recesses receiving the bent-over tabs to hold the insert firmly in place.

My invention will be better understood from the following description taken in connection with the accompanying drawing, and its scope will be pointed out in the appended claim.

Figure 1:
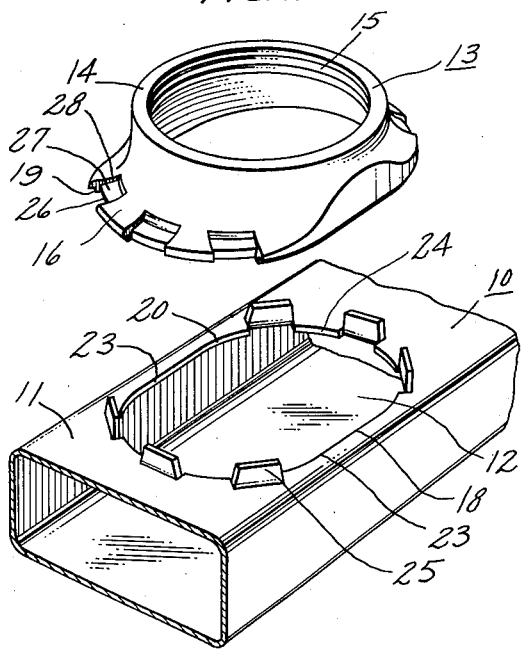
FIGURE 1 is an isometric view of a short section of duct having an opening in its top wall for receiving a die-cast insert that is pictured overhead.
Figure 2:
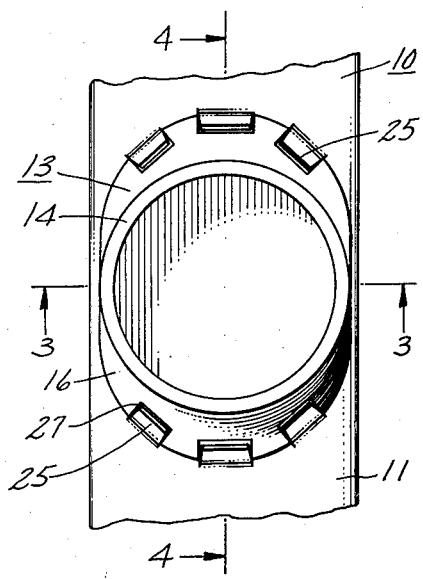
FIGURE 2 is a top plan view of a factory-set insert fastened to a wall of an electrical duct.

Referring in detail to the drawing and in particular to FIGURE 1, 10 represents a section of steel electrical raceway or duct having a rectangular cross-section. The duct has a top wall 11 with a generally oval-shaped opening 12. An insert 13 is pictured above the duct as it would be placed in the opening 12. The insert is an annular member with a rather intricate configuration. This is possible because it is a die-casting rather than a machine part. Previously, inserts of this type have been cut from pipe and provided with internal threads and mounting grooves in an operation performed on an automatic screw machine. Such prior art inserts were limited to the shape of a circular cylinder. Hence, the opening in the duct was also limited to a circular opening having a maximum diameter slightly less than the width of the duct. This invention includes a die-cast insert to gain the advantage of substituting an oval or elongated opening for the circular opening that has been used to date. The top portion 14 of the insert is cylindrical with internal threads 15. Floor outlet boxes (not shown) are provided with externally threaded nipples that are twisted into the inserts and supported therefrom. The lower or supporting portion 16 of the insert is of oval shape in plan view to conform to the size and shape of the opening 12 in the duct. This oval opening 12 in the top wall of the duct has its longitudinal axis in line with the longitudinal axis of the duct. This is important because the wires are to be drawn longitudinally through the duct and then up through the opening 12 and through the insert 13. Comparing the transverse cross-sectional view of FIGURE 3 with the longitudinal cross-sectional view of FIGURE 4, it will be readily apparent that the oval shape of the opening 12 allows a gradual 90° transition, as seen at 17, from the interior surface of the top wall 11 of the duct upwardly to blend into the cylindrical walls of the threaded section 14 of the insert.

Figure 3:
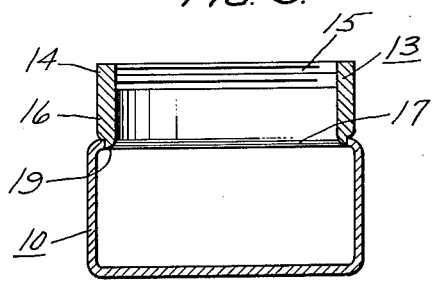
FIGURE 3 is a transverse cross-sectional view taken on the line 3—3 of FIGURE 2.
Figure 4:
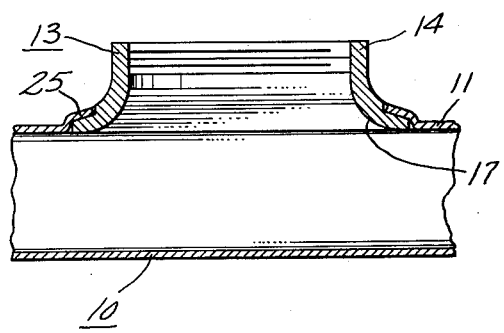
FIGURE 4 is a longitudinal cross-sectional view taken on the line 4—4 of FIGURE 2.

The supporting portion 16 of the insert is seated around the edge 18 of the opening 12 of the duct. A skirt 19, as seen in FIGURES 1 and 3, extends from the insert below the supporting portion 16. This skirt extends into the opening 12 and lines the interior edges 20 of the opening for the protection of the insulation of the wires as they are pulled out of the duct and up through the insert. The opening 12 is formed in a punch press by inserting a die cavity into the duct, clamping the duct in place and driving a punch down through the top wall 11 to shear the material until a blank is separated from the wall to leave the opening 12. This shearing action naturally causes burrs to appear on the interior edges 20 of the opening. Such burrs can be razor sharp and might possibly cut through the insulation of the wire if the wire were rubbed across such burrs.

As mentioned previously, the opening 12 in the top wall of the duct is of oval shape. It has parallel side walls 23 and rounded end walls 24. A group of bendable tabs 25 is located near each of the rounded ends 24 of the opening. These tabs are integral with the top wall 11 of the duct and were formed during the piercing operation of the opening 12. As shown in FIGURE 1, the tabs are folded back so that they stand upright for ease in assembling the insert. The supporting portion 16 of the insert has notches 26 formed in its outermost edges to receive the upright tabs 25. In addition, the supporting portion 16 has recesses 27 communicating with the notches. The tabs are to be bent inwardly into the recesses 27 to lie more or less flush therein. Each recess 27 has opposing side walls 28 which are parallel to each other. The tabs 25, however, converge toward the tip at an angle of approximately 1° on each side. The minimum width of the tab 25, where the tab merges with the wall 11, is made equal to or greater than the maximum spacing between the parallel walls 28 of the recess. Hence, it will be understood that there is a force fit or wedging action when the tab 25 is driven into the recess 27. Each tab 25 seals against the edge of the floor of the recess and also seals with a wedging action against the opposite side walls 28 of the recess. This is deemed desirable to form a moisture resistant connection between the insert and duct so that water will not drain into the duct and create a dangerous condition.

During the design and testing of this invention, various modifications of tabs and mating recesses were considered. During these tests a marked improvement was evident in the designs where the tabs were directed inwardly in the general direction of the center of the opening 12. The Underwriters' Laboratories requires that the insert be capable of withstanding a pulling force of 200 pounds. For this test they turn the duct upside-down and connect a sling to the insert for supporting a platform on which sandbags are loaded. We were happy to learn that this design was capable of withstanding a load in excess of 1100 pounds. This would indicate that perhaps one of the tabs in each group could be eliminated. If this were found desirable, we would elect to eliminate the center tab so as to retain the widest spacing between adjacent tabs as well as the widest radial angle.

Having described above my invention of a novel means for fastening an insert to a wall of a metal duct, it should be readily apparent to those skilled in this art that I added many quality features to an old art. I have reduced the cost of the design by using a die-cast insert while gaining improved results from the use of a large oval-shaped opening, and a perfectly smooth interior for the lower portion of the insert so that the transition from the duct to the insert cannot possibly injure the insulation of the wires. The bendable tabs have been designed to provide a moisture resistant seal between the insert and duct and there is no possibility that the insert could turn in the duct when a wrench is used to intsall the floor outlet box in the insert.

Modifications of this invention will occur to those skilled in this art and it is to be understood, therefore, that this invention is not limited to the particular embodiments disclosed but that it is intended to cover all modifications which are within the true spirit and scope of this invention.

What I claim as new and desire to secure by Letters Patent of the United States is:

An insert fastened in an opening in a thin metal wall, the opening being generally of oval shape with rounded end portions as seen in plan view, a group of bendable tabs integral with the wall adjacent each rounded end of the opening, the insert being an annular member that has a threaded cylindrical top portion and an oval-shaped lower portion that is supported on the edge of the opening, the outermost edges of the supporting portion of the insert containing a series of recesses to receive the tabs that are formed over to clamp the insert in place, the tabs in the clamping position being directed in the general direction of the center of the opening, there being a force fit between the side edges of each tab and the opposing side walls of its mating recess, the sides of each tab converging slightly toward the tip of the tab, while the opposing side walls of each recess are generally parallel, the maximum width of each tab being at least equal to the minimum distance between the sides of each recess whereby an interference fit between the mating parts is provided.

References Cited in the file of this patent

UNITED STATES PATENTS

| | | |
|---|---|---|
| 1,605,759 | Murdock | Nov. 2, 1926 |
| 1,773,811 | Flachbath | Aug. 26, 1930 |
| 1,809,864 | Pearson | June 16, 1931 |
| 2,100,168 | Melrath | Nov. 23, 1937 |
| 2,477,536 | Robinson | Aug. 24, 1948 |
| 2,842,384 | Foskett | July 8, 1958 |

FOREIGN PATENTS

| | | |
|---|---|---|
| 138,195 | Austria | Feb. 15, 1934 |
| 871,171 | France | Jan. 10, 1942 |